United States Patent
Hentunen

(10) Patent No.: US 10,360,379 B2
(45) Date of Patent: Jul. 23, 2019

(54) METHOD AND APPARATUS FOR DETECTING EXPLOITS

(71) Applicant: F-Secure Corporation, Helsinki (FI)

(72) Inventor: Daavid Hentunen, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 222 days.

(21) Appl. No.: 15/381,853

(22) Filed: Dec. 16, 2016

(65) Prior Publication Data

US 2017/0177866 A1    Jun. 22, 2017

(30) Foreign Application Priority Data

Dec. 21, 2015 (GB) .................................. 1522495.9

(51) Int. Cl.
*G06F 21/56* (2013.01)
*H04L 29/06* (2006.01)

(52) U.S. Cl.
CPC ........ *G06F 21/563* (2013.01); *H04L 63/1425* (2013.01); *H04L 63/1433* (2013.01); *H04L 63/1491* (2013.01)

(58) Field of Classification Search
CPC ............... G06F 21/563; H04L 63/1425; H04L 63/1433; H04L 63/1491
USPC .......................................................... 726/23
See application file for complete search history.

(56) References Cited

U.S. PATENT DOCUMENTS

| | | | |
|---|---|---|---|
| 7,774,459 B2 | 8/2010 | Wang et al. | |
| 2007/0208822 A1 | 9/2007 | Wang et al. | |
| 2007/0260702 A1* | 11/2007 | Richardson | G06F 9/45558 709/217 |
| 2009/0044274 A1* | 2/2009 | Budko | G06F 21/53 726/24 |
| 2010/0100591 A1* | 4/2010 | Mahaffey | G06F 9/54 709/204 |
| 2011/0131644 A1 | 6/2011 | Keanini et al. | |
| 2011/0185292 A1* | 7/2011 | Chawla | G06F 9/452 715/760 |

(Continued)

OTHER PUBLICATIONS

Combined Search and Examination Report under Section 17 and 18(3) issued by the United Kingdom Intellectual Property Office in relation to GB1522495.9 dated Apr. 22, 2016 (8 pages).

*Primary Examiner* — Harunur Rashid
*Assistant Examiner* — Sakinah White Taylor
(74) *Attorney, Agent, or Firm* — Robert P. Michal, Esq.; Carter, DeLuca & Farrell LLP

(57) ABSTRACT

Methods and apparatus are disclosed for detecting if a source of initial content is serving exploits to a target device exposed to initial content. The method includes selecting at least two target devices and dividing the selected target devices into at least two groups, and causing the at least two groups to appear towards the initial content as having different software profiles towards the initial content. Information is obtained regarding at least one of connections and content transmitted/received by the at least two groups as a result of exposure to the initial content. The obtained information between the at least two groups is compared. If the comparison indicates that target devices in one of the at least two groups transmit/receive at least one of additional connections and additional content due to being exposed to the initial content, deciding that a source of the initial content serves exploits.

21 Claims, 10 Drawing Sheets

(56) References Cited

U.S. PATENT DOCUMENTS

| | | | | |
|---|---|---|---|---|
| 2011/0202916 A1* | 8/2011 | VoBa | ............... | G06F 21/62 |
| | | | | 718/1 |
| 2013/0339298 A1* | 12/2013 | Muller | ............... | G06F 11/1464 |
| | | | | 707/640 |
| 2014/0123285 A1* | 5/2014 | Ludwig | ............... | G06F 21/55 |
| | | | | 726/23 |
| 2014/0380473 A1* | 12/2014 | Bu | ............... | G06F 21/53 |
| | | | | 726/23 |
| 2015/0096025 A1 | 4/2015 | Ismael | | |
| 2016/0098561 A1* | 4/2016 | Keller | ............... | G06F 21/554 |
| | | | | 726/24 |
| 2016/0294852 A1* | 10/2016 | Hagen | ............... | H04L 63/1425 |
| 2017/0063912 A1* | 3/2017 | Muddu | ............... | G06F 16/254 |
| 2017/0111374 A1* | 4/2017 | Harris | ............... | H04L 63/145 |

\* cited by examiner

METHOD AND APPARATUS FOR DETECTING EXPLOITS

CROSS-REFERENCE TO RELATED APPLICATION

This Application claims priority to United Kingdom Application No. 1522495.9, filed Dec. 21, 2015 the entire disclosure of which is incorporated herein by reference.

FIELD

The present invention relates to a method, an apparatus and a computer program product related to Internet security. More particularly, a mechanism is provided to detecting if a source of initial content serves an exploit to a target device.

BACKGROUND

Cloud computing, also known as on-demand computing, is a kind of internet-based computing, where shared resources and information are provided to computers and other devices on-demand. It is a model for enabling ubiquitous, on-demand access to a shared pool of configurable computing resources. Cloud resources are usually not only shared by multiple users but are also dynamically reallocated per demand.

An apparatus may comprise or represent any apparatus used to communicate with other apparatuses over a wired and/or wireless communication network. Examples of apparatuses that may be used in certain embodiments of the invention, but are not limited to, are wired or wireless devices such as, by way of example only, server devices such as web servers, databases, servers, proxy servers, and other network devices, entities, or apparatuses such as base stations, gateways, routers, access points or other devices that are connected to a wired and/or wireless communication network and used for communication and interaction. An apparatus may provide cloud computing resources.

A target device in connection to this application is a device which may be target of an exploit. A target device may comprise or represent any device used to connect to or access wired or wireless communication networks. Examples of target devices that may be used in certain embodiments of the invention are wired or wireless devices such as computers, mobile telephones, terminals, smart phones, portable computing devices such as lap tops, hand-held devices, tablets, net-books, personal digital assistants and other devices that can connect and communicate over a wired or wireless communication network. In some embodiments, a target device may comprise or represent an apparatus as disclosed above. For example, the target device may be a server device or a gateway device. In some embodiments, the target device is an apparatus, which has both client and server functionality, or which may not be clearly defined neither as a client or server. For example, the target device may be a gateway device which not clearly a client or a server, but it may be likewise exploited if it parses traffic traversing through itself. An example of such parsing is a gateway device which may run Flash files in its sandbox.

A software profile of a target device is a collection of data indicating what kind of software, such as operating system, kernel, firmware, applications and add-in modules, is used by said target device for example for accessing various selected types of content, receiving selected types of content or interacting with selected types of content or various types of communication counterparts. Such accessing or receiving of specific type of content may be referred to as being exposed to content. Likewise, interacting with a communication counterpart, which interaction includes receiving, sending or fetching bytes from said communication counterpart may be referred to as being exposed to content. The software profile further indicates versions of said software. Terms application and software may be used interchangeably as known by a person familiar with the art.

In computer security, an exploit is from victim point of view an object that causes software to behave in an unexpected and/or unwanted manner. The object is usually something that the software is unable to deal with. For example, a string of characters that does not fit an expected pattern, or a series of commands that the software is unable to correctly execute.

When an exploit forces the software to behave unexpectedly, an attacker can take advantage of the disruption to perform other, usually malicious, actions that would not normally be permitted. For example, an attacker might exploit one software on a computer in such a way that a second software is silently installed without authorization from the user or administrator of the target device.

When a software is unable to deal with an exploit because of an underlying flaw or loophole in its coding or implementation, the flaw is known as a vulnerability. Vulnerabilities can be found in any type of software, from simple macro scripts that run within a computer software, to the software itself, to the operating system that runs it and even on the 'firmware' that controls the physical components of a user's computer or mobile device.

For an exploit to be a danger however, an attacker must have some way to deliver it to the vulnerable software. For some vulnerabilities, this requires the attacker to have physical access to the targeted computer or mobile device. Far more dangerous is when an attacker can leverage a vulnerability from a distance, most commonly over the Internet.

An exploit kit is basically a utility program or toolkit that can deliver an exploit to its corresponding target software. If the exploit is successful, the kit can then deliver a malicious payload to the compromised target device.

In order to get targets to attack, exploit kit operators will typically host their kits on websites, which may be either maliciously crafted websites, or legitimate ones that have been compromised. The exploit kits can then silently probe target devices of any visitors to the site. In some cases, attackers may increase the flow of potential victims to the exploit kit by using some form of web traffic hijacking to redirect more visitors to the poisoned website. For example, websites might be hacked in order to quietly redirect target devices to the site hosting the exploit kit.

If a target device is found to be vulnerable to the exploit, the kit then downloads a payload onto the victim target device. The payload can be tailored according to the exploit kit operator's wishes, but typically include downloading such malware as ransomware, botnet-related components and banking-trojans.

Common exploit delivery mechanisms are for example hacked websites, benign websites with malicious advertisements and email. In email, an exploit may typically be delivered in attachments such as office document files or image files, but may also be placed in the email content, for example as a link. Further, exploits may be delivered through various communication enabling software such as USB protocol or IoT (Internet of Things) related software.

FIG. 1 shows a simplified, exemplary could computing system with a target device represented by a client device (100), which may be subject to an exploit serving. A website (101) has been compromised, thus capable of serving exploits. A user contacts the website (101) with his/her client device (100) in order to access some initial content. This exemplary website (101), although legitimate as such, has been infected with malware. If the client device (100) is found to use a version with a software which has a vulnerability that is used by an exploit, the client device (100) is redirected to receive content from a malicious website (102) which returns at least some additional content including an exploit towards the client device (100) instead of original content that was requested by the user of the client device (100).

Many benign websites use redirecting and provide access to content, such as advertisement, served by different websites without trying to serve exploits. Communication patterns caused by accessing content provided by a web site are often complicated, including for example accessing content linked to the accessed website from various sources also outside the website's own domain. Thus, it's difficult to recognize whether communication to and/or from various websites and download of content occurring due to a single target device contacting a web site actually serves an exploit, or represents just normal, intended and legitimate functionality of the website.

It's in the best interest of anyone programming exploits to first detect what version of a specific software of interest the target device is using. Different versions of the software have different vulnerabilities. Without knowing the version of the software, the attacker doesn't know which exploit to use. Using wrong exploit yields to an unsuccessful exploit attempt, which usually results in some kind of an error to be shown at the target device, thus exposing the exploitation attempt. This is highly unwanted by any exploit programmers, since in the case of hacked websites, there is a higher risk of someone reporting the incident and this may lead to detection of the exploit and cleaning up the infected website. Successful exploitation in many cases go unnoticed from the target device.

There is a desire for efficiently detecting and identifying initial content serving exploits or redirecting target devices to other domains serving exploits.

DESCRIPTION OF THE RELATED ART

U.S. Pat. No. 7,774,459 discloses a method for investigating exploitive behaviour by browsing Internet by comparing traces produced by different browsers used by a single user.

SUMMARY

A problem to be solved is to provide a method and apparatus for detecting if initial content a target device is exposed to serves an exploit. Detection of such initial content further allows protecting target devices from exploits.

An object is to provide a method and apparatus so as to solve the problem of detecting which initial contents are hacked and therefore are currently serving exploits or redirect target devices to some other domain that serves exploits. Initial content may refer to websites and/or content in websites, or files which may contain or serve exploits. An example of initial content is content such as advertisement files or links provided by advertisement networks which may contain or serve exploits. Another example of initial content is content or attachments in an email which may contain or serve exploits. A yet further example of initial content is a contact received from an IP address towards a target device, which target device may in this case even be a web server device or a gateway device. Further, initial content may be any bytes received or fetched by a target device, or bytes passively read by the target device.

The objects of the present invention are achieved with a method according to the characterizing portion of claims 1 and 24. The objects of the present invention are further achieved with an apparatus according to the characterizing portion of claims 13 and 28.

The preferred embodiments of the invention are disclosed in the dependent claims.

The present invention is based on an idea of observing connections and content received or transmitted by at least two groups of target devices after being exposed to similar initial content. Similar initial content may refer for example to same or similar content available on a website, which may be accessed by multiple target devices using various software. Similar initial content may also refer to similar messages, files or links received by a number of email clients, although each email client would actually receive different copies of such content, and some details such as recipient address and possibly some recipient specific content is different. Similar initial content may further refer to a contact or bytes of data received or read from a specific IP address. As the examples above illustrate, term similar initial content may thus refer to exactly same initial content, or initial content which is in many aspects similar but may have differences depending for example on the identity or location of the target device. Different result of exposure to similar initial content with target devices in at least two groups having apparently different software profiles may indicate that the initial content is serving exploits to target devices having a specific software profile, for example using a specific version of a particular software. Term apparently different software profiles refers to software profiles which are otherwise identical, but which appear different in relation to a version number of at least one software of interest. The difference appearing in the version number of a software of interest may be based on actually different software versions used by the target devices, or the version number may be changed to appear different towards the initial content, although the actual software profiles of all target devices in the at least two groups would actually be similar.

A target device group based comparison is preferably utilized. For this purpose, at least two groups of target devices are monitored which have otherwise essentially similar software profiles, but appear different in relation to at least one software of interest towards the initial content. The different appearance of target device software profiles may be based on actually different software profiles of the target devices, or the appearance of some target device's software profiles may be changed for purpose of the comparison without actually changing the software profiles. A benefit from comparison between at least two groups of target devices with such almost or exactly similar software profiles is improved capability to avoid false positives caused by normal functionalities of initial content, which causes different users to receive and/or transmit different connections and/or content without any misbehavior due to an exploit.

According to a first aspect, a method is provided for detecting if a source of initial content is serving exploits to a target device being exposed to said initial content. The method comprises selecting at least two target devices, dividing the selected target devices into at least two groups of target devices, causing the at least two groups to appear as having different software profiles towards said initial content, obtaining information about at least one of connections and content transmitted and/or received by the at least two groups as a result of being exposed to similar initial content, comparing said obtained information between the at least two groups, and if the comparison indicates that target devices in one of the at least two groups transmit and/or receive at least one of additional connections and additional content as the result of being exposed to similar initial content, deciding that a source of said initial content serves exploits.

According to a second aspect, said causing at least two groups to appear as having different software profiles is performed by any one of:

selecting, for a first group, target devices which have a first software profile and selecting, for at least one second group, target devices which have a second software profile different from said first software profile, and selecting target devices which all have mutually similar software profiles, and causing the software profile of all target devices in at least one of said groups to appear different from the software profile of target devices in any other group, while all target devices within any single group appear to have mutually similar software profiles.

According to a third aspect, said method further comprises prior to selecting said at least two target devices, receiving software profiles of said at least two target devices from exploit detection clients of said at least two target devices, and selecting the target devices based on said software profiles received.

According to another aspect, said at least two groups appear as having different software profiles with respect to version number of at least one software used for exposing target devices in said groups to said initial content.

According to another aspect, said causing the software profile of all target devices in at least one of said groups to appear different from the software profile of target devices in any other group is performed by controlling changing of a version number indicating version of a software used by all target devices in at least one of the groups in interaction of target devices in said group in relation to exposure to said initial content without changing the software version used by said target devices.

According to yet another aspect, the method further comprises monitoring at least one of connections and content transmitted and/or received by the two groups of target devices as a result of being exposed to said initial content in order to obtain said information about said at least one of connections and content.

According to another aspect, the method further comprises changing said version number.

According to yet another aspect, the method further comprises providing instructions to exploit detection clients of target devices in at least a first one of the at least two groups for changing the version number.

According to an aspect, the method comprises providing instructions to exploit detection clients of the target devices for monitoring at least one of connections and content received and/or transmitted by said target devices as a result of exposure to initial content in order to obtain said information about said at least one of connections and content and requesting said exploit detection clients to send information about said at least one of connections and content monitored by said exploit detection clients.

According to an aspect, an apparatus for detecting if a source of initial content is serving exploits to a target device being exposed to said initial content is provided, said apparatus comprising a processor, and storage media accessible by the processor. Said storage media includes an exploit detector means configured to select at least two target devices, divide the selected target devices into at least two groups of target devices, cause the at least two groups to appear towards said initial content as having different software profiles, obtain information about at least one of connections and content transmitted and/or received by the at least two groups as a result of being exposed to similar initial content and compare said obtained information between the at least two groups. If the comparison indicates that target devices in one of the at least two groups transmit and/or receive at least one of additional connections and additional content as the result of being exposed to similar initial content, decide that a source of said initial content serves exploits.

According to another aspect, the exploit detector is further configured to control changing of a version number indicating version of a software used by all target devices in at least one of the groups in interaction of target devices in said group in relation to exposure to said initial content without changing the software version used by said target devices.

According to an aspect, the exploit detector resides on a gateway apparatus serving said selected target devices, and said exploit detector is further configured to monitor at least one of connections and content transmitted and/or received by the two groups of target devices as a result of being exposed to said initial content in order to obtain said information about said at least one of connections and content.

According to yet another aspect, said exploit detector is further configured to change said version number.

According to another aspect, the exploit detector is further configured to provide instructions to exploit detection clients of target devices in at least a first one of the at least two groups for changing the version number.

According to another aspect, the exploit detector resides in a network apparatus, and said exploit detector is further configured to provide instructions to exploit detection clients of the target devices for monitoring at least one of connections and content received and/or transmitted by said target devices as a result of exposure to initial content in order to obtain said information about said at least one of connections and content, and request said exploit detection clients to send information about said at least one of connections and content monitored by said exploit detection clients.

According to an aspect, a method for detecting if a source of initial content is serving exploits to a target device exposed to said initial content is provided, comprising monitoring at least one of connections and content transmitted and/or received as the result of exposure to said initial content in order to obtain said information about said at least one of connections and content and sending information about said monitored at least one of connections and content.

According to another aspect, said method further comprises receiving a request to monitor said at least one of connections and content.

According to yet another aspect, the method further comprises receiving instructions to change a version number indicating version of a software used in interaction in relation to exposure to said initial content without changing the software version used and changing said version number.

According to an aspect, an apparatus for collecting information for detecting if a source of initial content is serving exploits to a target device exposed to said initial content. Said apparatus is configured to monitor at least one of connections and content transmitted and/or received as the result of exposure to said initial content in order to obtain said information about said at least one of connections and content and send information about said monitored at least one of connections and content.

According to another aspect, said apparatus is further configured to receive instructions to change a version number indicating version of a software used in interaction in relation to exposure to said initial content without changing the software version used and to change said version number.

According to an aspect, computer program is provided, comprising computer readable code means which, when run from a computer readable medium in the form of a memory in a processor of an apparatus, causes the apparatus to perform the method disclosed in any of above aspects.

According to another aspect, a computer program product comprising a computer readable medium and the computer program is provided, wherein the computer program is stored on the computer readable medium.

Further aspects of the invention provide methods, apparatus, and computer program(s) comprising program instructions, which when executed on a processor, perform the methods described herein as set forth in the appended claims, and also computer readable medium(s) including such computer program(s). Further features of the invention are outlined in the description below and in the appended claims. Preferred features are set out in the dependent claims.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
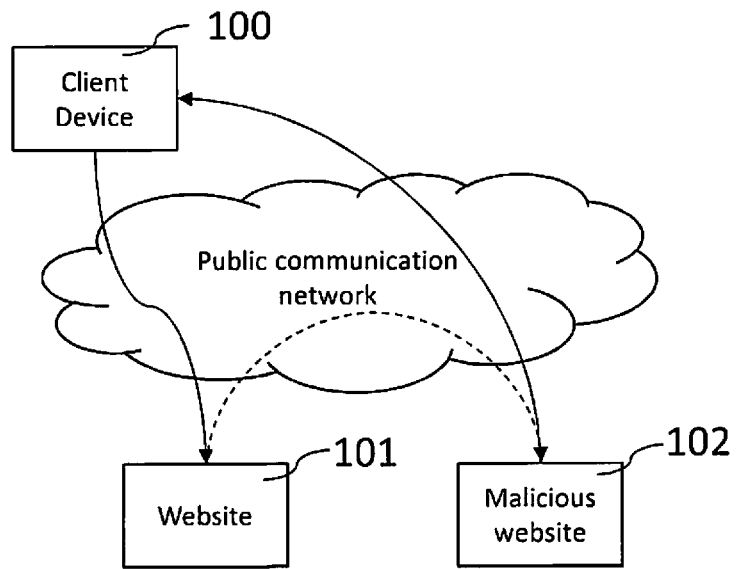
FIG. 1 shows a simplified, exemplary could computing system with a target device subject to exploit.
Figure 2:
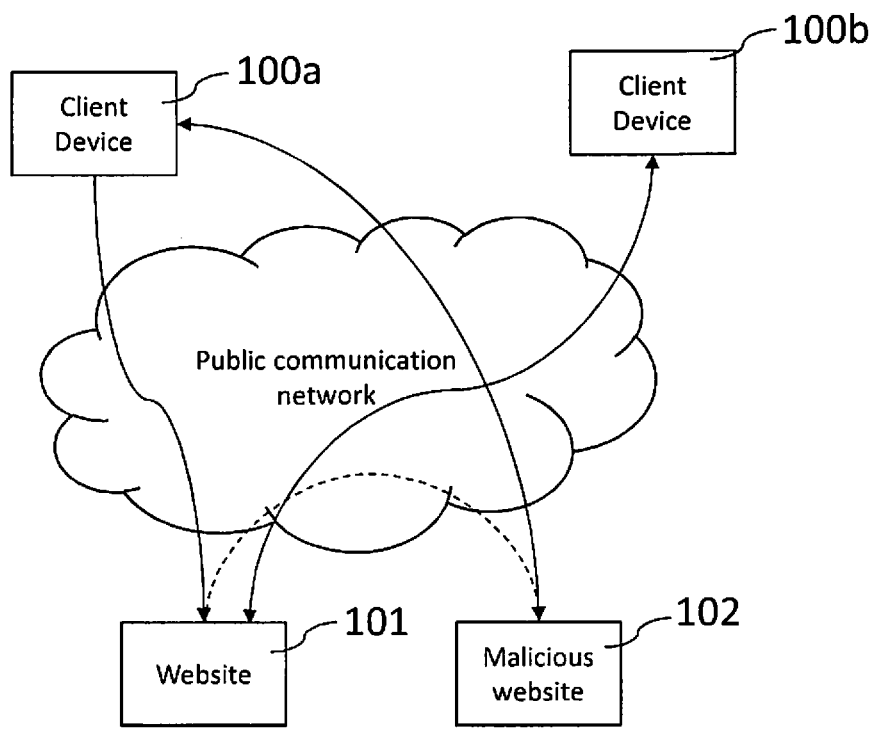
FIG. 2 illustrates a simplified exemplary cloud computing system with two different target devices.

FIG. 2 illustrates a simplified exemplary cloud computing system with two different target devices (100a, 100b), here presented by two client devices. A first client device (100a) experiences the same exploit serving initiated by connecting to the compromised website (101) as the client device (100) of FIG. 1. A second client device (100b) uses a different version of the software which causes the first client (100a) to be vulnerable to an exploit. This different version of the software does not have the same vulnerability, and thus the second client device (100b) is not redirected to the malicious website (102), but receives the original content from the website (101) through the public communication network as intended. It can be noticed from this simple example, that communication patterns of the first client device (100a) and the second client device (100b) are different. Comparing the communication patterns of these two client devices (100a, 100b) caused by contacting the same website (100) serving the initial content discloses, that the website (101) may be compromised or hacked and currently serves exploits. Instead of comparing communication patterns of just two client devices (100a, 100b), two groups of client devices may be selected for the purpose. Alternatively, more than two groups of target devices may be selected for comparison. This improves reliability of the detection in cases where it's the intended functionality of the initial content to cause different results for different client devices. An example of such case is a service where activating the same URL causes different client devices to enter their own, personal home pages, or a web page which causes the client device to receive advertisement from different advertisement sources based on their individual advertisement profiles. In such cases, the content or connections received and/or transmitted by said client devices is likely to some extent different, but this difference is not in any way related to version numbers of software used by these client devices, nor is it a sign of exploit serving. By including hundreds or thousands of client devices (target devices) in the at least two groups of client devices, it's possible to detect which differences in the received and/or transmitted content and/or connections really depend on the version numbers of software used by the target devices, which is of interest for exploit detection purposes. Big groups of target devices may be used for detecting certain types of exploits.

Figure 3:
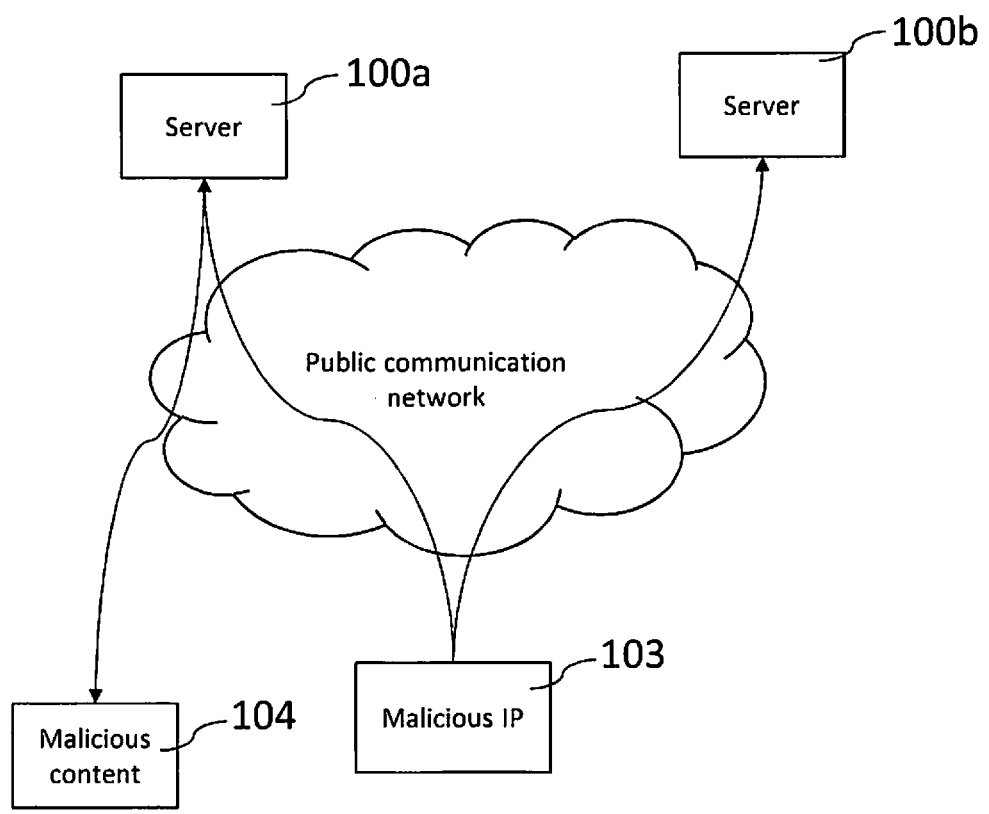
FIG. 3 illustrates another simplified exemplary system with target devices subject to exploit.

In another exemplary case illustrated in FIG. 3 the target device subject to an exploit is a passive web service provided by at least two servers. In this case, the initial content may refer to bytes received in a contact received from a specific IP address towards the web service, or bytes read by the web service. In this example, the target devices (100a, 100b) are thus the servers. The web service is provided by a target device (100a, 100b). In this case, the initial content is defined by an IP address (103) which contacts a specific IP address and port in the exploit detection target device, which in this example could be for example an IMAP server serving email clients. One of the target devices (100a) has a vulnerability, due to which the target device, when receiving a contact from the malicious IP address (103), is caused to run code served by the exploit, and additional malicious content (104) is received or fetched by this target device (100a) due to the exploit. Although the malicious content is illustrated here as separate source from the malicious IP address (103), the malicious content (104) may alternatively be served by the malicious IP address (103) itself. A second target device (100b) does not have or does not appear to have the vulnerability. Thus, the result of similar initial content (a contact received) from the same malicious IP address (103) does not cause any additional content (104) to be received, transmitted or fetched.

In order to enable comparison, at least two target devices are chosen for monitoring. These at least two target devices may reside in different IP addresses, or they may reside in same IP address, but serve various different domains. An example of the latter case is a virtual host server. Further, the at least two target devices are caused to appear towards the initial content as having different software profiles, i.e. using a different version of at least one software of interest.

When a vulnerability of a web service becomes known, there may be several parties who will try to find similarly vulnerable services on servers throughout the entire Internet IP address space before the vulnerabilities of the web services are fixed. A specific example of initial content defined by an IP address is an IMAP (Internet Message Access Protocol) service used by e-mail clients to receive e-mail messages from a mail server. An IMAP service may be available in two different, public IP addresses, both having a gate open towards the Internet. In this exemplary case, groups of target devices (servers providing the web service) each comprise just a single IP address and port, and they will likely receive just a single contact from the same initial content (same IP address), since the attacker checking through vulnerabilities of services would likely scan the IP addresses just once. In this example, each group of target devices (servers providing the web services) may comprise just a single target device. The result of an exploit may be for example an opened TCP (Transmission Control Protocol) connection from the exploited IMAP server to the Internet. Connection can for example retrieve and execute further malicious software or it can open a command shell for the attackers. Shell codes can be written to do practically anything so the result of the exploit can likewise be anything.

One known example of a vulnerability in certain implementations of an IMAP server software is a so called imapd Buffer Overflow Vulnerability, which allows the attacker to execute arbitrary code at the IMAP server remotely. In a worst case scenario, such code may even be executed with root privilege. IMAP supports a command "AUTHENTICATE", which specifies a type of authentication mechanism to be used to open a mailbox. A value passed to authenticate commend is copied to a buffer which size of 1024 characters. The value has, however, a maximum value of 8192 characters.

These excess characters may be used for serving an exploit to the IMAP server. In this kind of a situation, additional connections and/or content may be caused to at least one group of target devices after receiving an authentication message from a certain IP address, which allows recognizing the malicious exploit serving IP address. In this example, the target device is an IMAP server, and each group may comprise just a single IMAP server.

An exploit detection system utilizes cloud computing environment for enabling observation of any additional content and/or connections received and/or transmitted by more than one groups of target devices. The exploit detection system require existence of a hooking point to the communication traffic of the target devices, in other words, a point at which the exploit detection system is capable of detecting connections of the target devices and, in some embodiments, also changing certain parts of the communication traffic from the target devices towards the Internet communication network and thus towards the initial content.

Such hooking point may reside for instance in a gateway device such as a company firewall or a communication gateway which routes traffic to and from multiple target devices towards a public communication network. This gateway device may be for instance a company gateway connecting all target devices within a company network towards the Internet or other public communication network. According to further examples, a hooking point may reside in an IMAP server, or in an inline IPS (Intrusion Prevention System), which may be a standalone device or integrated functionality in a firewall.

Figure 4:
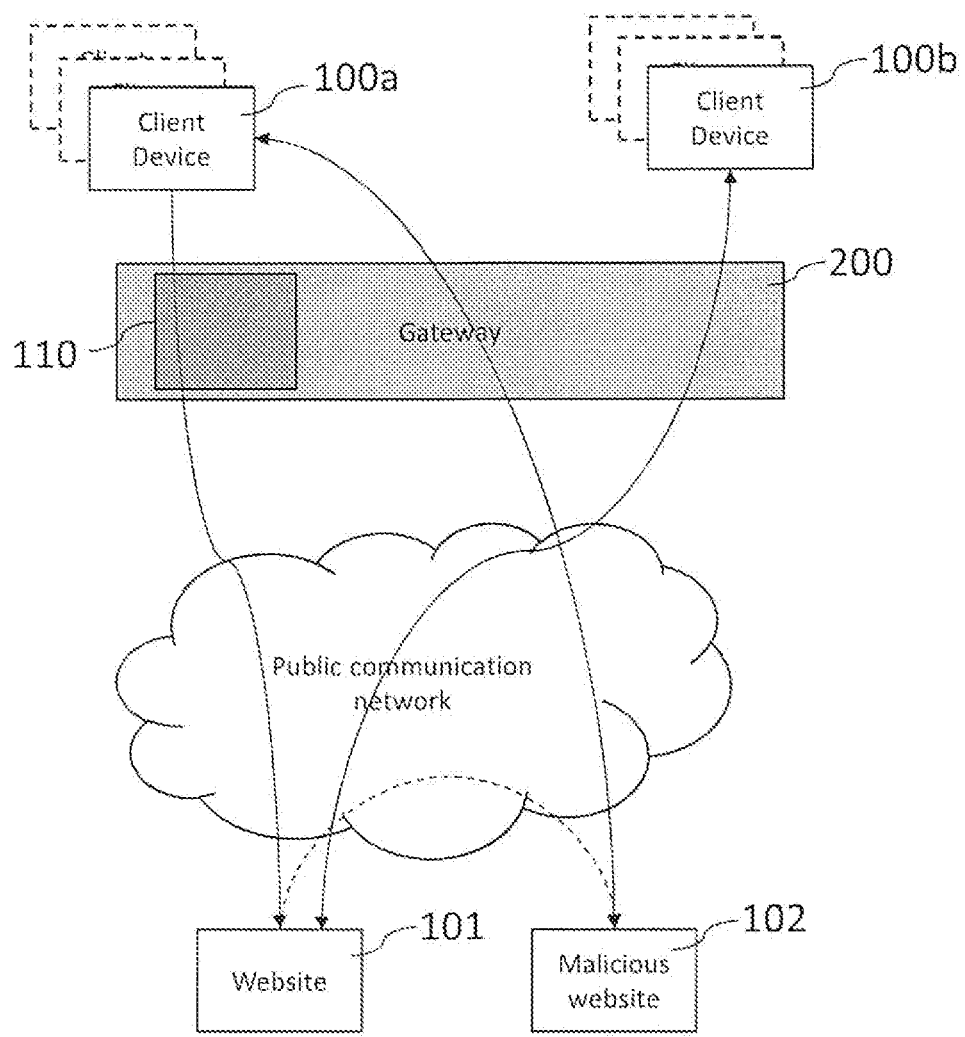
FIG. 4 illustrates an exemplary exploit detection system.

FIG. 4 illustrates an exploit detection system implemented with a gateway device (200). In this example, groups of client devices represent the target devices (100a, 100b), i.e. the devices which are possibly subject to exploit and monitored for exploit detection purposes. While all client device traffic in and out of the company network goes through the gateway device (200), it's convenient to arrange an exploit detector (110) or at least a hooking point thereof within or in close connection to such a gateway device (200). The exploit detector (110) residing at gateway device may optionally even modify certain outgoing communication from the client devices (100a, 100b) in order to obtain the information needed for detection. For exploit detection purposes, groups of target devices (100a, 100b) may be defined, as illustrated with additional target devices marked with dotted lines. The communication patterns of these two groups of target devices (100a, 100b) may be compared with each other.

Alternatively, a hooking point may be arranged at the target devices themselves.

Figure 5:
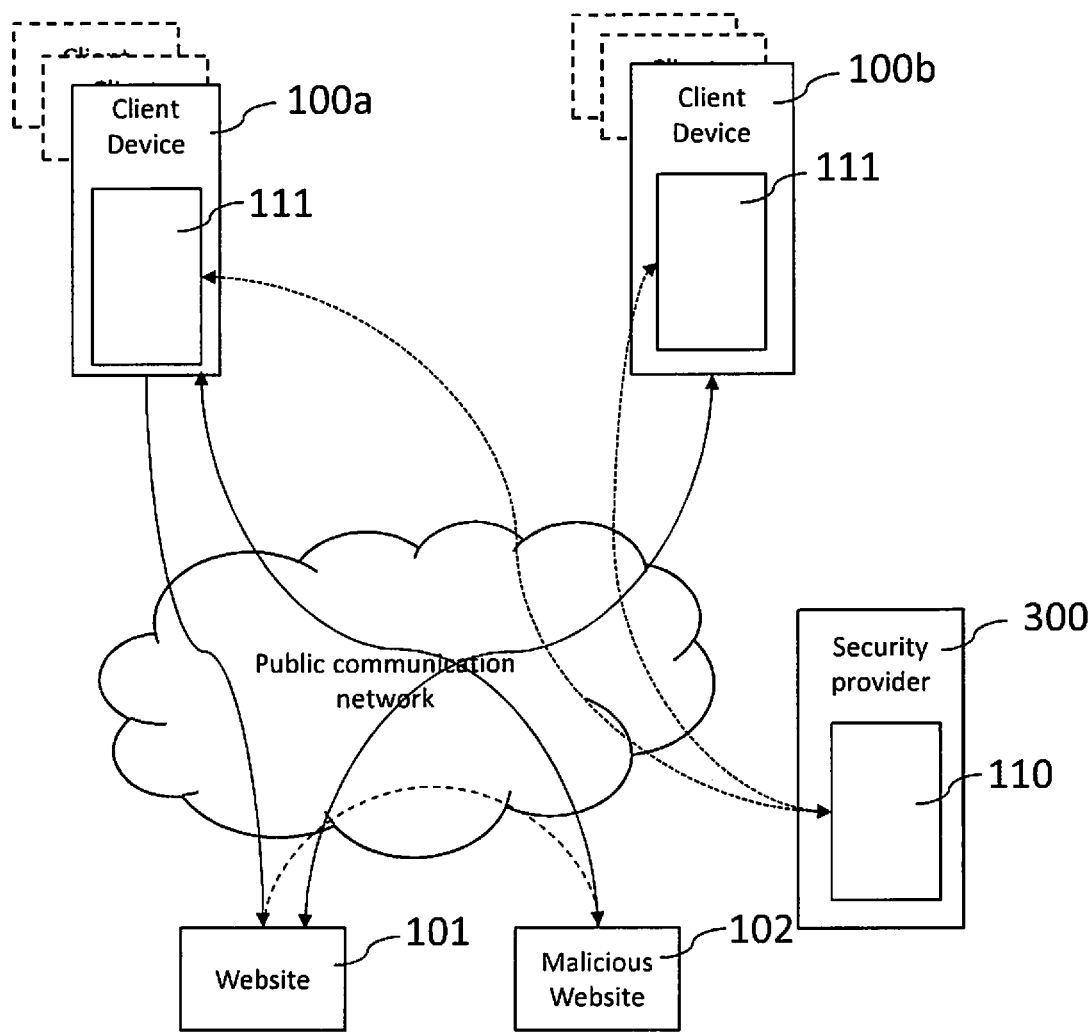
FIG. 5 illustrates another exemplary exploit detection system.

FIG. 5 illustrates an exemplary exploit detection system where client devices with hooking points of an exploit detection system arranged in exploit detection client applications (111) running on the target devices (100a, 100b). In order to arrange such a hooking point arrangement in a target device (100a, 100b), a consent from the target device user or administrator is needed. Such hooking point may be for example a functionality of an Internet security application, such as an antivirus application, an Internet security application or an intrusion prevention system, or a firewall application installed at the target device, providing limited access to the Internet security application provider to detect and collect certain types of target device data and target device communication data. When a target device (100a, 100b) has been selected to participate exploit detection process, the exploit detection client application (111) running at each of the target devices (100a, 100b) monitors connections in and out of the respective target device (100a, 100b). Optionally, the exploit detection client application (111) may even modify certain outgoing communication in order to cause change of the version number of the software of interest. Only by having at least two groups of target devices appearing as having different software profiles it's possible to obtain the content and communication data needed for comparison and exploit detection. As illustrated in this example, two groups of target devices (100a, 100b) may be defined, each of which target devices is running an instance of the exploit detection client application (111) so that comparison of the received content and communication patterns may be group based for improved reliability of exploit detection. Alternatively, more than two groups of target devices may be defined.

Assessment of exploit detection is performed in a common part of the exploit detection system, the exploit detector (110) available in the cloud computing environment. In this example, the common part of the exploit detection system, the exploit detector (110) is arranged at an Internet security provider apparatus (300), such as a physical server apparatus or a virtual server residing in the cloud computing environment. As the detection solution is based on comparison of groups of target device content and/or communication, target device communication data needs to be collected from multiple exploit detection client applications (111) running on multiple target devices (100a, 100b) and collected in one place for comparison. A client base of target devices using specific Internet security or firewall application is an example of a group of target devices among which the exploit detection system may choose the target devices (100a, 100b) whose received content and/or communication patterns to be compared. The exploit detection client applications (111) are configured to monitor the target device communication and/or content received and possibly change appearance of provided version numbers thereof in relation to at least one software version number. The exploit detector (111) may be considered as a kind of a server functionality, configured to instruct the exploit detection client applications (111) of the target devices (100a, 100b) selected into the group of target devices to monitor the connections and content and to send the collected communication and/or content related monitoring data back to the exploit detector (111), which performs the comparison. The Internet security provider apparatus (300) may reside anywhere in the cloud computing system.

Typical known applications (software) which are subject to exploit attacks and thus of interest for monitoring of exploit detection include Adobe FlashPlayer, various PDF readers, Java, different browsers, email clients and various office document types. Any third party web services may serve exploits. Further examples of applications subject to exploits are for example point-to-point applications, such as point-to-point communication applications like Skype and various file sharing applications. An example of the latter is uTorrent. In web servers, exploits may relate to server software such as Apache (for a HTTP server), BIND (for DNS), SMTP, IMAP, SSH, FTP and so on, just to mention a few.

Making a comparison between received content and/or communication patterns of target devices using different versions of the same software enable utilizing a typical feature of exploits, namely a self-defense logic, for recognizing initial content that possibly servers exploits. A typical exploit utilizes a known weakness of a specific version of the target software.

An exploit with a self-defense logic only activates if the software used for exposing the target device towards the initial content is recognized as being of the known version of the specific software and thus having this known vulnerability of the specific version. This is because trying to use an exploit through another version of the same software not having the same vulnerability may reveal the exploit to the user of the target device, which is usually not wanted by the party serving and utilizing the exploits.

Typically, an exploit is specific for a software, and also for specific version(s) of the software. A party trying to serve an exploit typically checks not only one, but several pieces of software used by the target device at the same time. For example, it may be of interest for an exploit serving party to recognize both the software version and the version of the operating system used by the target device. As known to a person familiar with the art, the operating system version may be visible for example through an API provided by a software. Operating system and version thereof is preferably part of the software profile information used for selection of the target devices for exploit detection.

There are two alternative ways to utilize self-defense logic of the exploits for recognizing initial content serving exploits. Either, a comparison may be made between responses caused by the initial content with at least two target devices or at least two groups of target devices which actually use two different versions of the at least one software of interest, or the comparison may be performed in a group of target devices all having exactly similar software profile, by dividing this group into at least two groups of target devices and changing (forging) the version number of the at least one software of interest to an old, new or even an unpublished one for target devices in at least one of the groups so that at least one of the groups appears towards the initial content as of it had a different software profile from any other of the groups and thus uses a different version of the software of interest. Changing a software version number in this embodiment does not indicate that the version was actually changed, but only the indication of software version is changed by the exploit detection system, either by the exploit detector or the exploit detection client, in the communication towards the initial content.

Target devices with similar software profiles indicates that said target devices have similar versions of the software of interest in use, and that they also use similar add-in modules in the software in case these add-ins may affect the results of the detection. For example, if a target device with a browser application has one or more add-in modules activated that block scripts and/or advertisement, such as for example NoScript or AdBlock modules, from being run on the browser, such target device will likely receive different response from a website serving initial content, such as for example scripts or advertisement, when compared with a response received by a target device using the same browser application with same version but without such add-in modules. Selecting target devices into each one group of target devices which have mutually similar software profiles thus enables ensuring that only the version of the at least one software of interest affects the results of comparison. By choosing target devices with exactly similar software profiles, the appearance of the software profiles towards the initial content may be controlled through changing version numbers of the at least one software of interest. Alternatively, target devices may be chosen into each of the at least two groups whose software profiles only differ in respect to the selected version(s) of the at least one software of interest. Whichever option above is used, it can be ensured that only those parameters of the software profiles which are chosen to appear different between different groups and thus may have an effect on the result of the comparison between the different groups actually do so, and the results are not affected by other parameters. The parameters here refer to any type of data contained in a software profile. With selected groups of multiple target devices, the reliability of the comparison and the decisions made based on the comparison may be improved from comparison between just single target devices within each group. Large groups of target devices are typically available when the target devices are for example client devices. If target devices are for example servers or gateways, there is likely not a large group of target devices available, but the comparison is made between smaller groups or even between individual target devices.

For ensuring similar software profiles in relation to browser plugins, detecting target devices running certain plugins in their browser applications may be implemented by detecting whether an API (Application Programming Interface) for accessing the relevant plugin was ever called. Another method for detecting existence and/or use of certain plugins is simply to check browser plugins installed and/or activated in the target device.

Figure 6:
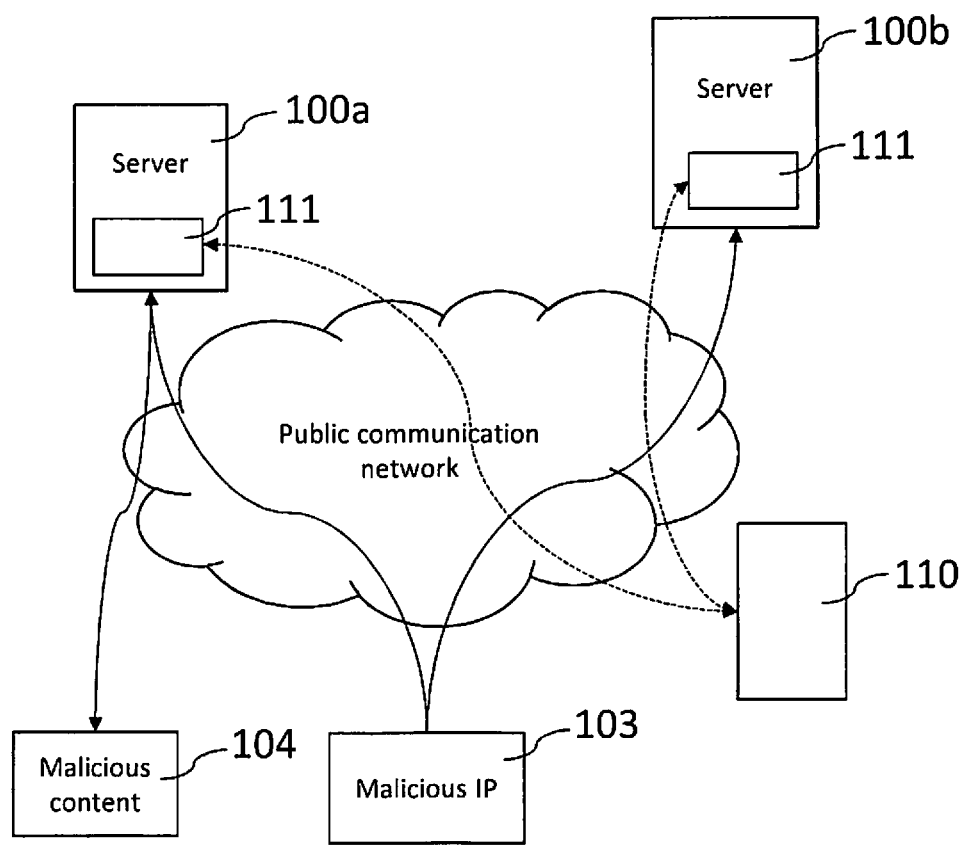
FIG. 6 illustrates yet another exemplary exploit detection system.

FIG. 6 illustrates another exemplary exploit detection system where target devices—this time server devices—have been equipped with exploit detection client applications (111) running on the target devices (100a, 100b). This example shows an example for exploit detection for servers such as those illustrates in relation to FIG. 3. The functionality of the exploit detection system is very similar to that of FIG. 5, except that it's not likely that there would be a large amount of server type target devices (100a, 100b) available for group based comparison. An exploit detection client application monitors the content and connections of the target device (100a, 100b) and provides the monitoring results for the exploit detector (110) for comparison.

The target devices of FIG. 6 may represent for example two different IMAP servers (100a, 100b) running the same version of IMAP software. When an IP address contacts TCP port 143 of an IMAP server, the IMAP server indicates the version of itself towards the contacting IP address (103), for instance with command "* OK [CAPABILITY IMAP4REV1 I18NLEVEL=1 LITERAL+ SASL-IR LOGIN-REFERRALS START-TLS LOGINDISABLED] localhost IMAP4rev1 2007e.404 at Mon, 14 Dec. 2015 16:32:50+0200 (EET)", and waits for a response from the contacting IP address (103). IMAP server (100b) equipped with an exploit detection client (111) with version number modification capability may be instructed to change the version number "IMAP4rev1 2007e.404" provided in the above for example with another version number "IMAP4rev1 2018z.404". If the IP address (103) contacting the IMAP server was malicious and in process of searching for IMAP servers with the older version "IMAP4rev1 2007e.404" having the vulnerability, receiving the changed version number would indicate to the malicious IP address (103) that the first IMAP server (100b) does not have the vulnerability, and the connection would likely be terminated. A second IMAP server (100a) using the same "IMAP4rev1 2007e.404" version of the software would on other hand return the actual version number, as it was not instructed to change the version number. Thus, the malicious IP address (103) recognizes the potential vulnerability of the second IMAP server (100a) it may start serving an exploit by sending an authentication message which is longer than what the buffer configured to store contents of said message can store. For example:

"* AUTHENTICATE {2048}"

If the IMAP server would have the vulnerability, a buffer overflow would occur, and by sending a suitable set of characters, the malicious IP address (103) would be able to run its own code at the second IMAP server (100a). One possible result would be an additional TCP connection from the second IMAP server (100a) to malicious content (104). This TCP connection could for instance cause opening of an interactive command shell on the second IMAP server (100a) or fetching and installing some malicious content such as an unwanted software on the IMAP server (100a). By monitoring connections and content by the exploit detection clients (111) and comparing the obtained monitoring results with the exploit detector (110) would be able to recognize the malicious IP address (103).

Figure 7:
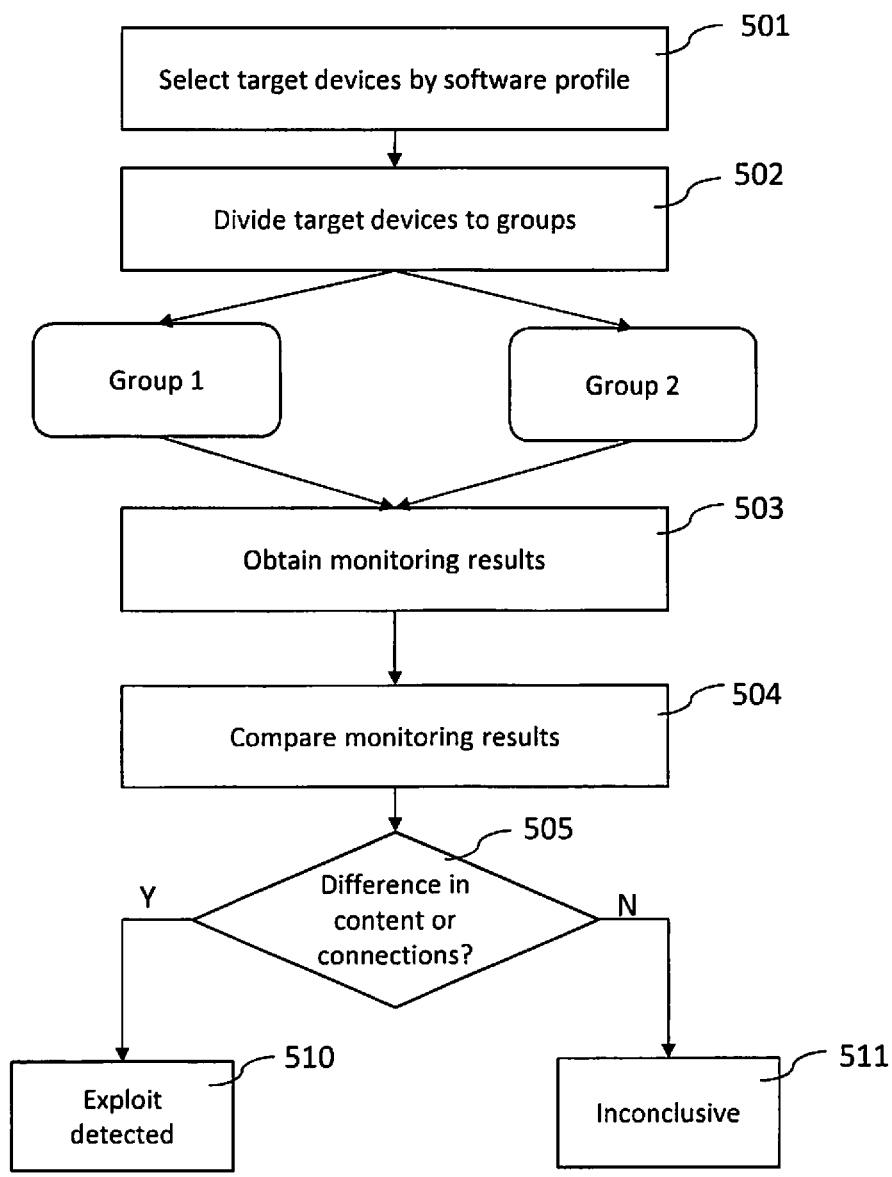
FIG. 7 illustrates an embodiment of a method for detecting exploits.

FIG. 7 illustrates an embodiment of a method for detecting exploits. In one embodiment of the disclosure, target devices are selected in phase 501 to be used in the comparison who have otherwise similar software profiles, but use two different versions of the at least one software of interest. In this embodiment, at least two target devices are selected using exactly two different versions of the at least one software of interest in order to make the comparison straightforward and reliable. Preferably, the software profiles of the selected target devices are identical except for the selected software versions. At least two target devices are selected, so that the target devices may be divided in to two groups (Group 1, Group 2) in phase 502 for group based comparison. Both of these groups of target devices (Group 1, Group 2) have one or more target devices in them. Current example uses just two groups for simplicity, but it's understood that more than two groups may be used instead. Target devices are divided in the groups so that in a first target device group (Group 1), all target devices have mutually similar software profiles and they all also use the same version of the at least one software of interest. In the second target device group (Group 2), target devices also have mutually similar software profiles and they use mutually the same version of the at least one software of interest. However, the versions of the at least one software of interest used by the target devices differ between the two groups. The target devices of the second target device group (Group 2) may have a very recent version of the software of interest, newer than the target devices in the first target device group (Group 1).

Figure 8:
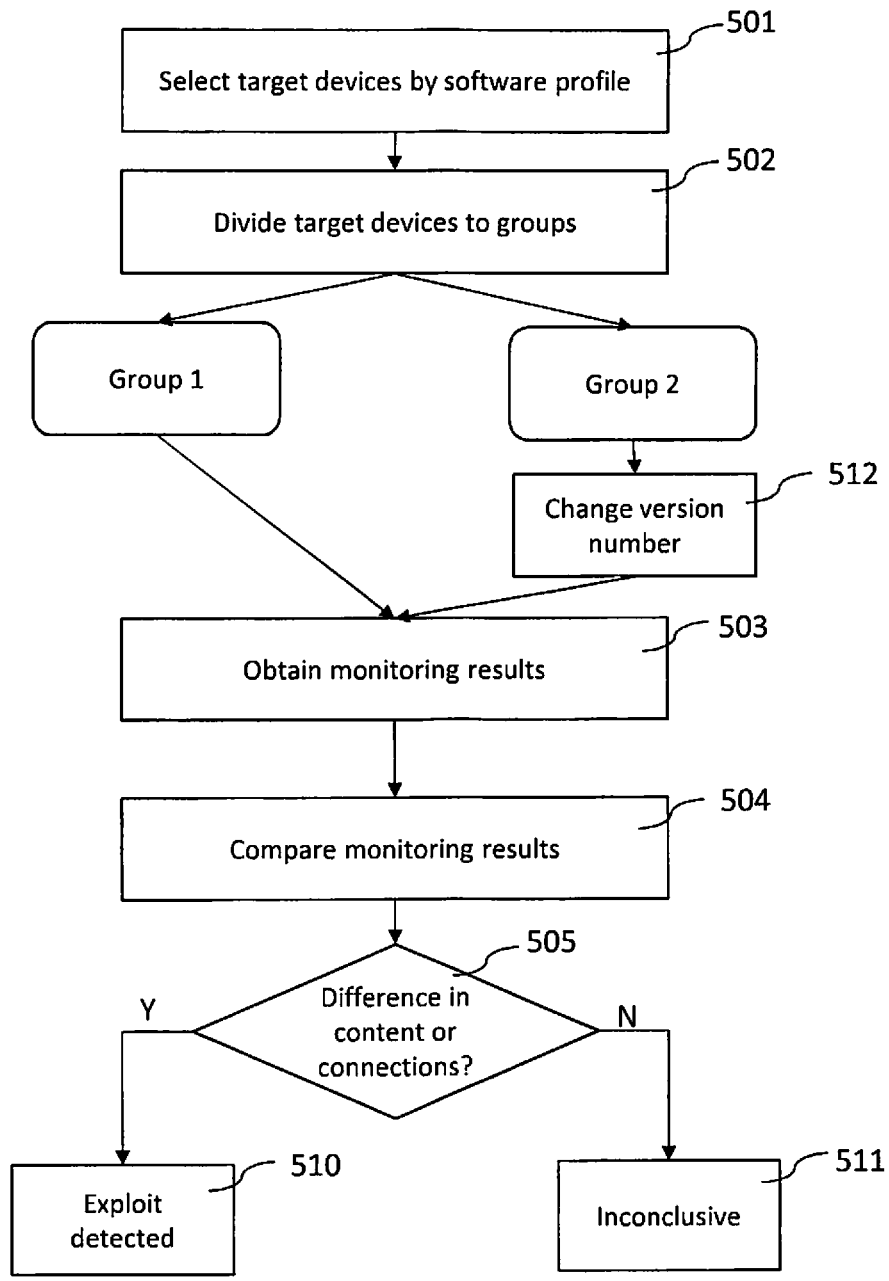
FIG. 8 illustrates another embodiment of a method for detecting exploits.

In another embodiment of the disclosure, illustrated in FIG. 8, all target devices to be used in the comparison are selected in phase 501 who all have exactly similar software profiles. This selected group of target devices with similar software profiles is then divided into two different groups (Group 1, Group 2) in phase 502. As in the previous example, division to more than two groups may be used instead. Two groups are used in this example for simplicity. For the first group of target devices (Group 1), no changes are made. For the second group of target devices (Group 2), the version number returned by at least one software of interest is changed in phase 512 during monitoring. The exploit detector is at least responsible of controlling the changing of the version number. It has control of which software version numbers are changed and which are those changed version numbers. The changing itself may be a functionality of the exploit detector itself, a functionality of the exploit detection clients residing at the target devices, or it may be performed by another program having access to the communication paths of the target devices. The version number of the at least one software of interest may be changed to an old version, to a very new version of the software, or even to a version which is not even released yet by the software vendor. In any case, the version number is changed to some version number which is different from the actual version number of the software of interest used by the client device. Changing the version number to an old, a new or even an unpublished one utilizes the same a typical feature of exploits, namely a self-defense logic, as the earlier embodiment. As explained earlier, changing the appearance of a software version does not mean actually changing the software version itself, but just forking the appearance and/or communication towards the initial content so that the software version number appears different from the actual software version used by the target device.

After either choosing the two groups of target devices (Group 1, Group 2) with different software profiles in phase 502 or changing the version numbers returned by at least one software of interest of the second group of target devices in phase 512, monitoring results of instances where at least one target device in either group is exposed to similar initial content are obtained in phase 503, common to both processes disclosed in FIGS. 5 and 6. If more than one target devices are chosen in each group, monitoring results indicating communication and/or content transmitted and/or received by more than one target devices in each group are obtained. Such initial content may be for example a URL (Uniform Resource Locator) related to a potentially hacked website, a Flash document downloaded from a website or email content or email attachment, or any other type of initial content identified hereinabove. Monitoring includes monitoring of at least one of communication patterns and content received and/or transmitted by said target devices in response to being exposed to said initial content. As illustrated hereinabove, the two groups of target devices appear as having different software profiles. This apparent difference may be based on actually differing software profiles (FIG. 7), or just the appearance has been changed towards the initial content (FIG. 8).

The method for obtaining varies depending on construction of the exploit detection system. If the exploit detector resides on a gateway device common to multiple target devices, the exploit detector may itself monitor content and/or communication of the target devices, and obtain the monitoring result data itself form comparison. However, in a system where exploit detection clients of the target devices are configured to monitor content and/or connections, the obtaining monitoring results may include steps of instructing the exploit detection clients to monitor connections and/or content of the target devices, and receiving the monitoring results from the exploit detection clients. The exploit detection clients thus receive the instructions from the exploit detector to perform the monitoring, and based on this request they perform the actual monitoring of the connections and/or content, and send the monitoring results back to the exploit detector. Obtaining may occur over a period of time, and monitoring results may be sent to the exploit detector instantly after monitoring, or at a later point of time. Sending may occur on basis of the initial monitoring instructions, or it may be performed only after the exploit detection client receives a request for sending the monitoring request. As a result of the obtaining phase (503), monitoring results from both groups of target devices (Group 1, Group 2) is collected to a common repository accessible by the exploit detector for analysis in phase 504.

As illustrated both in FIGS. 7 and 8, a possible exploit may be recognized by comparing in phase 504, by identifying whether additional content and/or connections were received and/or transmitted by the target devices in the two groups related to exposure to similar initial content. If the first target device group (Group 1) with one software version observes for example additional connections or redirection to different or additional sites for receiving content compared to that of the second target device group (Group 2) with another software version, this may be used in the decision phase 505 as an indication of redirecting target devices in the first group (Group 1) to a website with an exploit kit (phase 510). If the first target device group (Group 1) transmits or receives additional content, such as for example additional Flash documents or receives bytes over an AUTHENTICATE message causing for example malicious shell code to be delivered to an IMAP server type target device, it's possible that the initial content serves an exploit to target devices with a software profile like that of the first target device group (Group 1). Additional content may for example include a shellcode that is executed on the target device and causes injection of malware in the recipient's computer and often also creation of an additional connection to a malicious website.

If additional connections or content is observed in both groups, the exploitation detection verdict related to the specific initial content is inconclusive (phase 511). Using groups for comparison, instead of observing just two instances of a target device being exposed to similar initial content helps filtering out possible false positives. For example, when comparing just two target devices being exposed to similar initial content, each one could receive or transmit one additional connection or content which the other one does not. In such case, it's impossible to say whether this difference is due to an exploit or not. If the verdict is inconclusive, a new exploit detection process may be initiated using for example different target device groups with different pair of versions of the software of interest for a new comparison.

An example of a kind of exploit is so called 0-day vulnerability, which refers to cases where a vulnerability of a software has been recognized, but the software vendor has not yet released a fix to the vulnerability. In some cases, exploit programmers don't even bother checking the software version, or they only check that it's new enough so that the feature containing the vulnerability is already present in the software. However, some exploits utilizing 0-day vulnerability may only function if the version of the application is new enough. In such cases, comparing results of accessing similar initial content with an old and a new version of the application may still provide possibility to recognize the exploit, since a non-successful exploit serving due to a version of application incompatible with the exploit may cause a different response to accessing the initial content from a response received when a successful exploit is served utilizing the 0-day vulnerability.

Code for checking for vulnerable software's version number is typically written in JavaScript on hacked website or in another website where the user is redirected from the hacked website. Comparing two groups of target devices with apparently different versions of the software may also reveal this type of exploits as long as some kind of minimum software version check is made by the exploit kit. In such case, it's the newer version of the software which may cause additional content to be downloaded or causes additional connections, while the older version of the software used by the first group of target devices does not fulfil the minimum version and does not initiate the exploit action.

Another example of a kind of exploit relates to web services. In this case, the server providing the web service may be considered as a target device in view of exploit detection.

Yet another example of a kind of exploit relates to malicious Flash files. Some malicious Flash files themselves have a logic of detecting the FlashPlayer software version used by the target device, and only running the exploit functionality if this version is vulnerable. In these cases, no additional content is probably detected for the first group with the older version of the software, but additional connection may be detected for the group with a vulnerable software version. In such case, such additional connection may result from successful execution of shellcode delivered by a malicious Flash file.

Using the version change functionality of the exploit detection method this type of malicious Flash files may be detected. The inspected FlashPlayer software version number may be changed to one so new that it can't be considered vulnerable to any exploitation logic. The differences between traffic and payload related to target devices who appear to utilize such new version and that of target devices who have otherwise similar software profile but an older version of the FlashPlayer software (without any software version number changes) discloses changes produced after both these target devices (target device groups) visited the same website or URL (Uniform Resource Locator) and are thus exposed to same initial content. Any changes in traffic or payload may be interpreted as signs of exploitation attempts.

An exemplary method for detecting the version number of a FlashPlayer is to use SWFObject JavaScript Library. An example of how a version number of FlashPlayer may be detected in JavaScript

```
if(swfobject. hasFlashPlayerVersion("9.0.115"))
{
    alert("You have the minimum required flash version (or newer)");
{
else
{
    alert("You do not have the minimum required flash version.");
}
``` where the SWFObject-library uses function
ActiveXObject("ShockwaveFrlas.ShockwaveFlash.*")
  .GetVariable("$version")
and similar functions to figure out the exact Flash version this particular target device is running.

In order to be able to change the version number provided in a function call by the target device, the function calls needs to be detected by the exploit detector functionality responsible of the version number changing and hooked on. This functionality, which may be implemented in the exploit detector itself or in an exploit detection client application, may be referred to as a hooking point of the exploit detection system.

Another exemplary method for detecting the version number of a FlashPlayer when ActiveScript is used for writing Flash/SWF files, the running Flash version number may be checked through a request over the FlashPlayer API, such as:
  import flash.system.Capabilities;
  var versionNumber: String=Capabilities.version;

In such case, the API responsible for returning the Capabilities.version information need to be accessed by the exploit detection functionality such as exploit detector or an exploit detection client for changing the version number returned. This is another example of a hooking point of the exploit detection system.

Figure 9A:
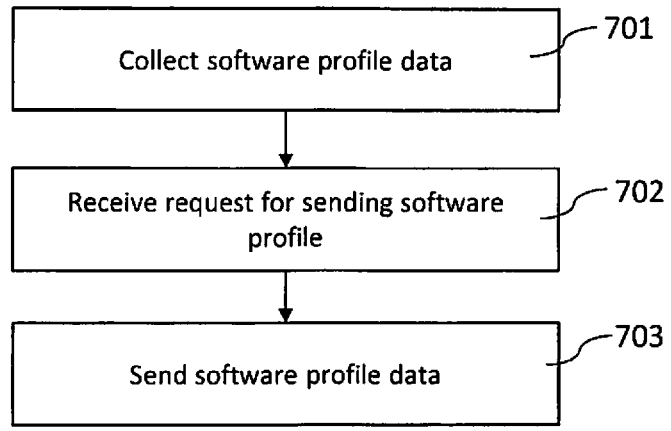
FIGS. 9a and 9b illustrates an exemplary embodiment of a method performed by an exploit detection client in a target device.
Figure 9B:
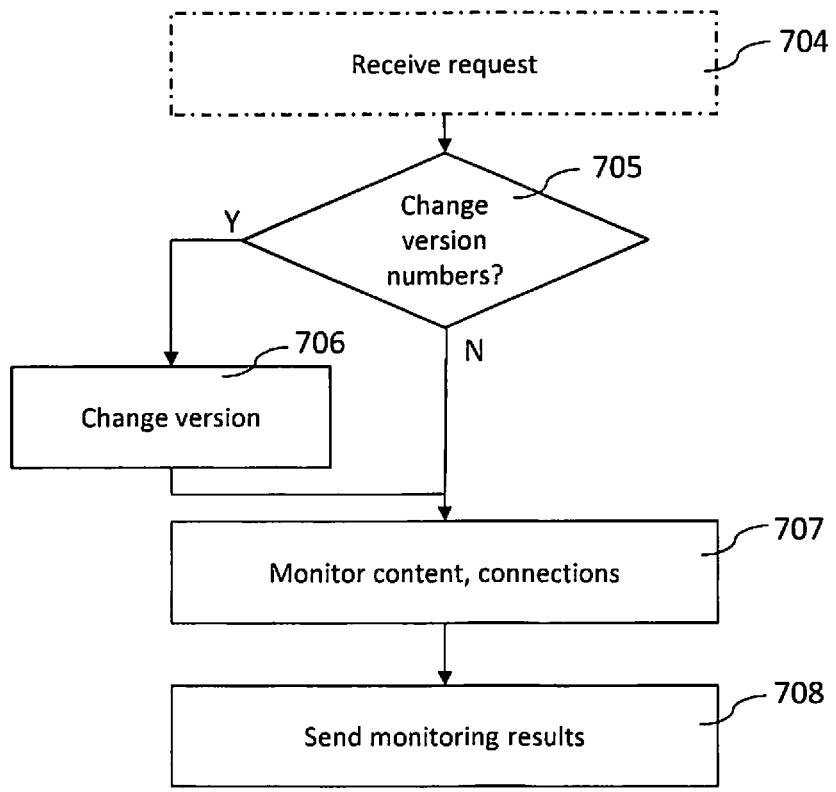

FIGS. 9a and 9b illustrates an exemplary embodiment of a method performed by an exploit detection client in a target device.

FIG. 9a illustrates exemplary steps of method for assisting an exploit detector by a target device having an exploit detection client running in it. While the exploit detection master runs on a different cloud computing apparatus, such as a gateway (200) or a server (300), information about software profile of the target device needs to be provided for the exploit detector in order to enable it to perform selection and grouping of target devices. In this example, the software profile data is collected by the exploit detection client in phase 702. This collection may be performed automatically by the exploit detection clients (111) for certain software of interest, or it may be initiated with a specific request from the exploit detector. A request to send a software profile is received from the exploit detector in phase 702, and the requested software profile data is sent to the exploit detector in phase 703. In an alternative embodiment, first two steps are switched so that the software profile collection step (701) is only performed after receiving a request to collect the software profile from the exploit detector in step 702. The latter version has the benefit that the software profile is most up-to-date at the time of receiving it at the exploit detector. A further embodiment is that the software profile of a target device is sent towards the exploit detector every time a change is detected in the software profile. In this latter case, the separate software profile request phase 702 may be entirely omitted.

FIG. 9b illustrates exemplary steps of method for performing exploit detection monitoring related steps in a target device. A request for data monitoring may be received from an exploit detector (110) in phase 704. This may be for example a request to monitor connections and content related to accessing a specific website or a selection of websites, or to monitor connection and content related to email received from certain recipients or having specific types of content. A yet further example of initial content is a contact towards the target device received from a specific IP address. As indicated above, this first phase 704 is optional. Instead of receiving a specific request, the exploit detection client may automatically perform monitoring of content and/or connections when installed and activated on a target device.

Instead, together or in addition to receiving a mere request for communication and/or content data monitoring and collection, the target device may also receive in phase 704 a request to change a version number of a specific software for outbound communication. If such request is detected in phase 705, indication of version of the specified software of interest will be changed to a different from the one actually installed in and used by the target device to any subsequent communication responses towards initial content as illustrated with phase 706. Changing of the software version may be performed by the exploit detection client itself through the hooking capability built in to the exploit detection client software. If no request to change the version number is received, the actual version number of the software of interest will be provided in subsequent communication as usual. The exploit detection client has built-in hooking capabilities to change the version number indications. The exploit detection client then monitors content and/or connections or exercises the pre-defined monitoring of content and/or connections as result of exposure to the initial content in phase 707. The results of monitoring are collected and monitoring results are sent back to the exploit detector in phase 708 for comparison. The monitoring results include information about said at least one of connections and content. In one embodiment the monitoring and sending steps are repeated. In another embodiment the monitoring is performed for a specified period and monitoring results obtained during the specified period are sent back to the exploit detector after the specified period.

Figure 10:
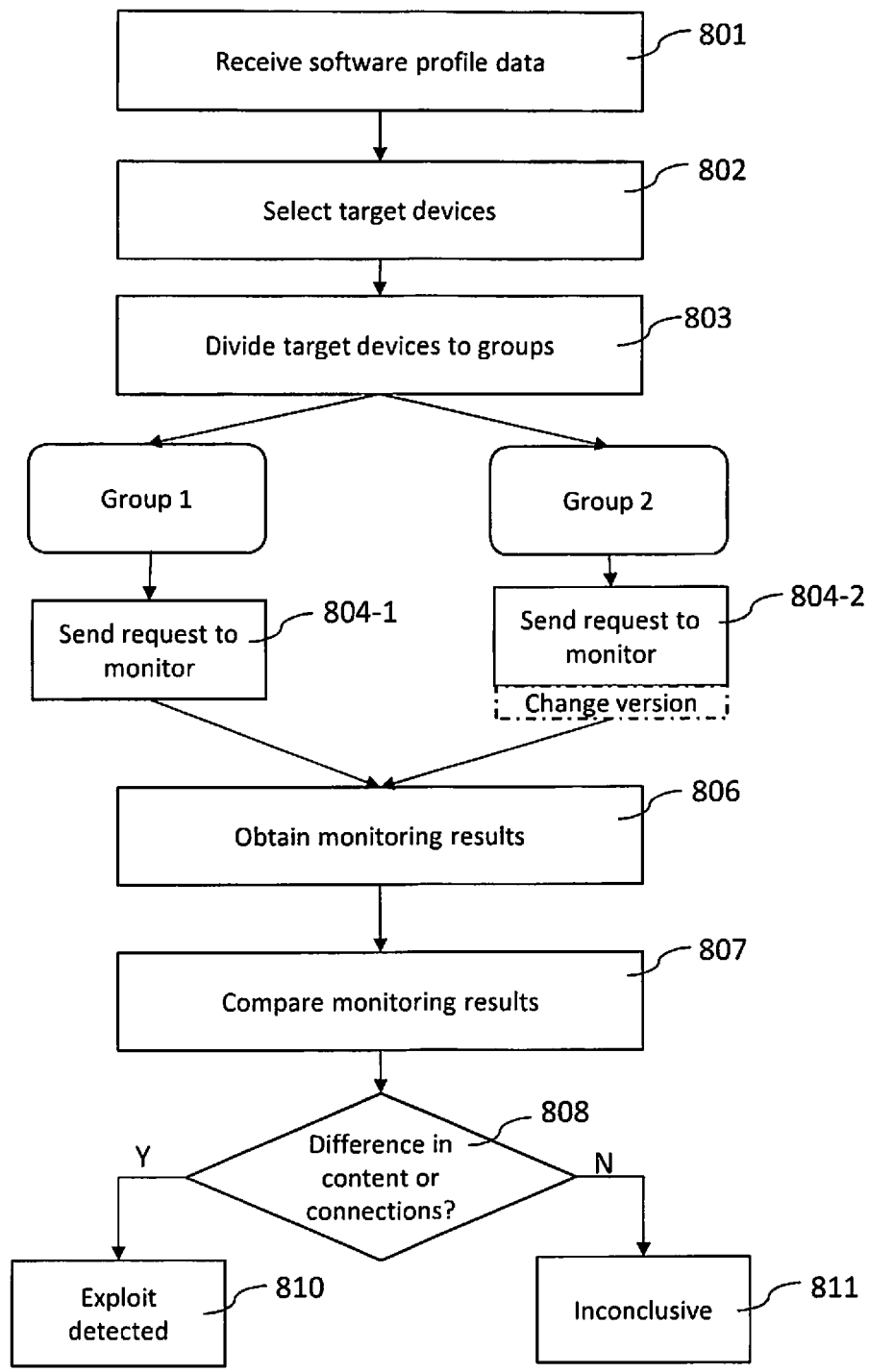
FIG. 10 illustrates an exemplary embodiment of a method for detecting exploits.

FIG. 10 illustrates an exemplary embodiment of an exploit detection method performed by an exploit detector residing in a cloud network server. In order for the exploit detection master application (in short, the exploit detector) to be able to select target devices suitable for exploit monitoring, it needs information on software profiles of the target devices. While the exploit detector itself has no direct access to such data, it may receive data from exploit detection clients residing on target devices as illustrated with phase 801. The software profile data may be received automatically, or based on separate requests sent by the exploit detection master (not shown) to the exploit detection clients. Based on the software profile data of clients devices, target devices are selected by the exploit detector in phase 802 which have suitable software profiles for the purpose of exploit detection. As disclosed earlier, these selected target devices may be ones which all have similar software profiles, or the selected target devices may have two or more different software profiles, where the software profiles essentially differ by certain selected version numbers of at least one selected software of interest. Next, the selected target devices are divided into two groups (Group 1, Group 2) in phase 803. In an alternative embodiment, the target devices may be divided into more than two groups. In this example, two groups are used for simplicity and clarity.

If the two groups (Group 1, Group 2) are selected from target devices having two different software profiles, each group may simply be sent a request to monitor content and/or connection received and/or transmitted by the target device as a result of using the selected at least one software to access initial content. In this case, the requests sent in phases 804-1 and 804-2 have essentially similar content. If the target devices in the two groups initially have all similar software profiles, an additional request to change the appearance of a specific software version number in relation to at least one software of interest is sent to the second group (Group 2) in phase 804-2. This is illustrated with the additional dashed box attached to phase 804-2. The instruction for changing the version number may be part of the message(s) used to deliver the request to monitor, or the instruction for changing the version number may comprise at least one separate message. The exploit detector is responsible for controlling the changing of the version numbers by the exploit detection clients.

The exploit detection clients now perform monitoring of connections and/or content of the target devices. The results of this monitoring are sent back towards the exploit detector, which obtains the monitoring results from the exploit detection clients in phase 806. The monitoring results are stored in a suitable memory or database arrangement for subsequent comparison. As illustrated earlier, obtaining monitoring results may comprise sub-phases like sending a request towards the exploit detection clients for monitoring and sending a request to send monitoring results data. The obtaining phase 806 includes in this embodiment at least the operation of receiving the monitoring results from the exploit detection clients.

In phase 807, a comparison of the monitoring result data in the two groups is performed. If differences are detected (808) between the monitoring results obtained from the two groups (Group 1, Group 2) caused by exposure to similar initial content, an exploit is deemed to be detected, and the exploit detection process thus comes to phase 810. If no difference in content or connections is detected in the comparison of the monitoring results, the process proceeds to phase 811 indicating that detection was inconclusive. No exploit was thus detected with this method. A new round of exploit detection may be performed with a different group of target devices appearing to have a different pair of software versions of the at least one software of interest, and/or monitoring different sources of initial content.

Figure 11:
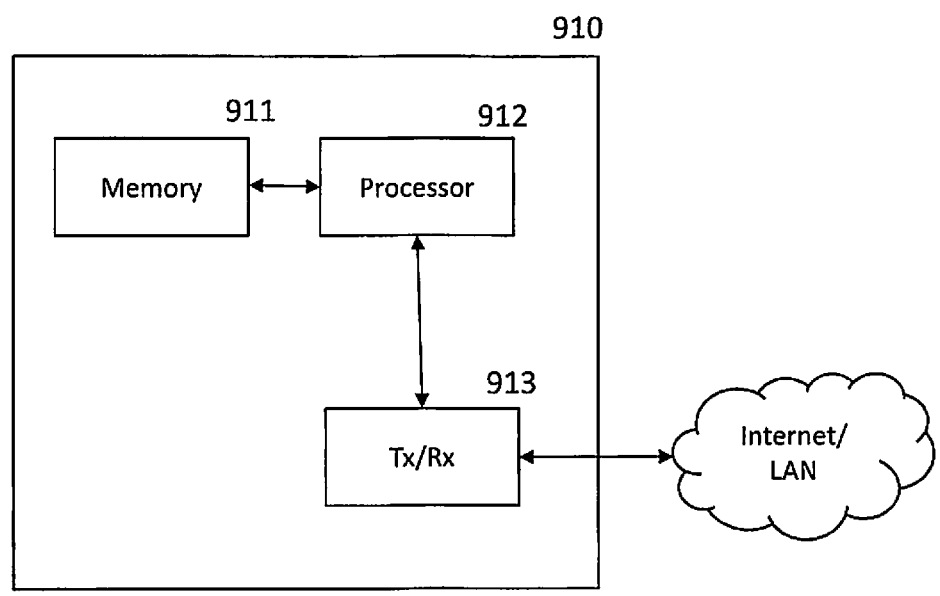
FIG. 11 is a schematic illustration of a computer device.

FIG. 11 is a schematic illustration of a computer device 910 which may be used for performing the method of exploit detection. Such computer device 910 may represent a target device (100, 100a, 100b), or an apparatus such as a gateway device (200) or a server (300). The apparatus 910 is implemented as a combination of computer hardware and software. The apparatus 910 includes at least one memory 911, at least one processor 912 and at least one transceiver 913. At least one transceiver 913 is configured to handle communication between the computer device 910 and an external network such as Internet or LAN. The at least one memory 912 stores the various programs/executable files that are implemented by the processor 912. The programs/executable files stored in the at least one memory 911, and implemented by the at least one processor 912 includes at least one of an exploit detector, or an exploit detection client application, depending on the role of the computer device in the exploit detection process. The memory 911 may also be configured to store monitoring results.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for detecting if a source of initial content is serving exploits to a target device being exposed to said initial content, said method comprising:
   selecting at least two target devices;
   dividing the selected target devices into at least two groups of target devices;
   causing software profiles of target devices in at least one of said groups to appear different from software profiles of target devices in any other group by controlling changing of a version number indicating version of software used by all target devices in at least one of the groups in interaction of target devices in said group in relation to exposure to said initial content without changing the software version used by said target devices;
   obtaining information about at least one of connections and content transmitted and/or received by the at least two groups as a result of being exposed to similar initial content;
   comparing said obtained information between the at least two groups;
   if the comparison indicates that target devices in one of the at least two groups transmit and/or receive at least one of additional connections and additional content as the result of being exposed to similar initial content, deciding that a source of said initial content serves exploits; and
   if the comparison indicates that target devices in multiple of the at least two groups transmit and/or receive at least one of additional connections and additional content as the result of being exposed to similar initial content, deciding that whether a source of said initial content serves exploits is inconclusive.

2. The method according to claim 1, wherein said method further comprises:
   prior to selecting said at least two target devices, receiving software profiles of said at least two target devices from exploit detection clients of said at least two target devices; and
   selecting the target devices based on said software profiles received.

3. The method according to claim 2, wherein said method further comprises:
   requesting software profiles from at least two target devices.

4. The method according to claim 1, wherein said version number of a software is changed by changing any one of:
   a version number provided in a function call;
   a version number returned over an API of the software in response to a request; or
   a version number observed in a network communication.

5. The method according to claim 1, the method further comprising:
   monitoring at least one of connections and content transmitted and/or received by the two groups of target devices as a result of being exposed to said initial content in order to obtain said information about said at least one of connections and content.

6. The method according to claim 1, further comprising:
providing instructions to exploit detection clients of target devices in at least a first one of the at least two groups for changing the version number.

7. The method according to claim 1, further comprising:
providing instructions to exploit detection clients of the target devices for monitoring at least one of connections and content received and/or transmitted by said target devices as a result of exposure to initial content in order to obtain said information about said at least one of connections and content; and
requesting said exploit detection clients to send information about said at least one of connections and content monitored by said exploit detection clients.

8. The method according to claim 1, wherein said initial content is any one of:
a website;
content accessed on a third party web service;
an application accessed on a third party web service;
an attachment in a message received by a target device;
a file intended to be accessed with a software;
a contact received from an IP address; and
bytes received from an IP address.

9. An apparatus for detecting if a source of initial content is serving exploits to a target device being exposed to said initial content, said apparatus comprising:
a processor;
storage media accessible by the processor, said storage media including an exploit detector configured to:
select at least two target devices;
divide the selected target devices into at least two groups of target devices;
cause software profiles of target devices in at least one of said groups to appear different from software profiles of target devices in any other group by controlling changing of a version number indicating version of software used by all target devices in at least one of the groups in interaction of target devices in said group in relation to exposure to said initial content without changing the software version used by said target devices;
obtain information about at least one of connections and content transmitted and/or received by the at least two groups as a result of being exposed to similar initial content;
compare said obtained information between the at least two groups;
if the comparison indicates that target devices in one of the at least two groups transmit and/or receive at least one of additional connections and additional content as the result of being exposed to similar initial content, decide that a source of said initial content serves exploits; and
if the comparison indicates that target devices in multiple of the at least two groups transmit and/or receive at least one of additional connections and additional content as the result of being exposed to similar initial content, deciding that whether a source of said initial content serves exploits is inconclusive.

10. The apparatus according to claim 9, wherein said exploit detector is further configured to:
receive software profiles of at least two target devices from exploit detection clients of said at least two target devices prior to selecting said at least two target devices; and
select the target devices based on said software profiles received.

11. The apparatus according to claim 10, wherein said exploit detector is further configured to:
request software profiles from at least two target devices.

12. The apparatus according to claim 9, wherein said version number of a software is changed by changing any one of:
a version number provided in a function call;
a version number returned over an API of the software in response to a request; or
a version number observed in a network communication.

13. The apparatus according to claim 9, wherein the exploit detector resides on a gateway apparatus serving said selected target devices, and said exploit detector is further configured to:
monitor at least one of connections and content transmitted and/or received by the two groups of target devices as a result of being exposed to said initial content in order to obtain said information about said at least one of connections and content.

14. A method for detecting if a source of initial content is serving exploits to a target device exposed to said initial content, said method comprising:
monitoring at least one of connections and content transmitted and/or received as the result of exposure to said initial content in order to obtain said information about said at least one of connections and content;
sending information about said monitored at least one of connections and content;
receiving instructions to change a version number indicating version of a software used in interaction in relation to exposure to said initial content without changing the software version used; and
changing said version number.

15. The method according to claim 14, said method further comprising:
receiving a request to monitor said at least one of connections and content.

16. The method according to claim 14, wherein said method further comprises:
receiving a request to send a software profile;
sending the software profile in response to receiving said request.

17. An apparatus for collecting information for detecting if a source of initial content is serving exploits to a target device exposed to said initial content, wherein said apparatus is configured to:
monitor at least one of connections and content transmitted and/or received as the result of exposure to said initial content in order to obtain said information about said at least one of connections and content;
send information about said monitored at least one of connections and content;
receive instructions to change a version number indicating version of a software used in interaction in relation to exposure to said initial content without changing the software version used; and
change said version number.

18. The apparatus according to claim 17, further configured to:
receive a request to monitor said at least one of connections and content.

19. The apparatus according to claim 17, further configured to:
receive a request to send a software profile;
send the software profile in response to receiving said request.

20. A non-transitory computer storage medium having stored thereon a computer program code for implementing a method for detecting if a source of initial content is serving exploits to a target device being exposed to said initial content, the method comprising:
- selecting at least two target devices;
- dividing the selected target devices into at least two groups of target devices;
- causing software profiles of target devices in at least one of said groups to appear different from software profiles of target devices in any other group by controlling changing of a version number indicating version of software used by all target devices in at least one of the groups in interaction of target devices in said group in relation to exposure to said initial content without changing the software version used by said target devices;
- obtaining information about at least one of connections and content transmitted and/or received by the at least two groups as a result of being exposed to similar initial content;
- comparing said obtained information between the at least two groups;
- if the comparison indicates that target devices in one of the at least two groups transmit and/or receive at least one of additional connections and additional content as the result of being exposed to similar initial content, deciding that a source of said initial content serves exploits; and
- if the comparison indicates that target devices in multiple of the at least two groups transmit and/or receive at least one of additional connections and additional content as the result of being exposed to similar initial content, deciding that whether a source of said initial content serves exploits is inconclusive.

21. A non-transitory computer storage medium having stored thereon a computer program code for implementing a method for detecting if a source of initial content is serving exploits to a target device exposed to said initial content, the method comprising:
- monitoring at least one of connections and content transmitted and/or received as the result of exposure to said initial content in order to obtain said information about said at least one of connections and content;
- sending information about said monitored at least one of connections and content;
- receiving instructions to change a version number indicating version of a software used in interaction in relation to exposure to said initial content without changing the software version used; and
- changing said version number.

* * * * *